March 5, 1929. H. HANSEN Re. 17,225

LOCKING MECHANISM

Original Filed June 16, 1922 3 Sheets-Sheet 1

Inventor
Herman Hansen,
By his Attorneys
Pindle, Wright & Buell.

March 5, 1929. H. HANSEN Re. 17,225

LOCKING MECHANISM

Original Filed June 16, 1922 3 Sheets-Sheet 2

Inventor
Herman Hansen
By his Attorneys
Friedle, Wright & Small

March 5, 1929. H. HANSEN Re. 17,225

LOCKING MECHANISM

Original Filed June 16, 1922 3 Sheets-Sheet 3

Inventor
Herman Hansen,
By his Attorneys
Prindle, Wright & Prindle

Reissued Mar. 5, 1929. Re. 17,225

UNITED STATES PATENT OFFICE.

HERMAN HANSEN, OF NEW YORK, N. Y., ASSIGNOR TO FRANCIS KEIL & SON, INC., A CORPORATION OF NEW YORK.

LOCKING MECHANISM.

Original No. 1,605,893, dated November 2, 1926, Serial No. 568,724, filed June 16, 1922. Application for reissue filed July 28, 1927. Serial No. 209,152.

My invention relates to a mechanism to be locked, the construction of which is adapted for many different uses where great security is desired.

The object of my invention is to provide a lock which is so constructed that a bolt operated thereby is rotated in order to bring a lateral projection thereon into engagement with a bolt-socket so as to prevent the direct longitudinal withdrawal of the same without previously rotating the bolt to disengage the lateral projection from the bolt-socket. Further objects of my invention will appear from the detailed description contained hereinafter.

While my invention is capable of embodiment in many different forms, for the purpose of illustration I have shown only one form thereof in the accompanying drawings, in which—

Figure 12:
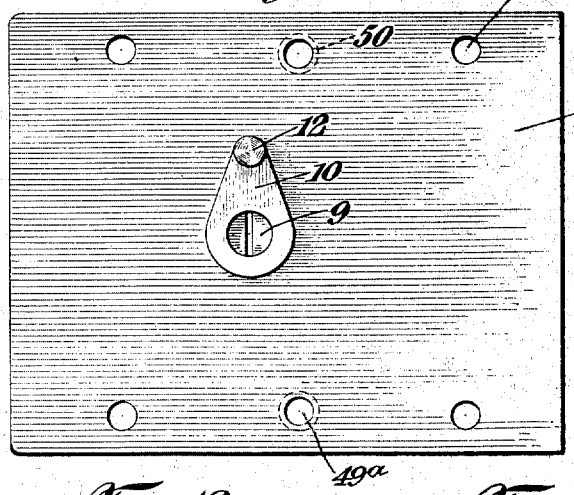
Fig. 12 is an elevation of the cover plate and the lock-operating lever thereon.
Figure 15:
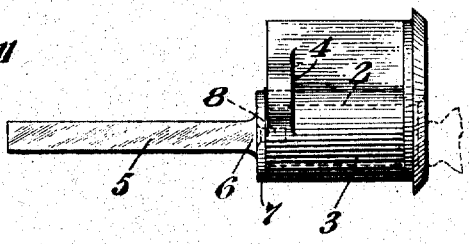
Fig. 15 is a side elevation showing the key receiving barrel for operating the lock, the barrel casing for enclosing the same and a key for the lock.
Figure 16:
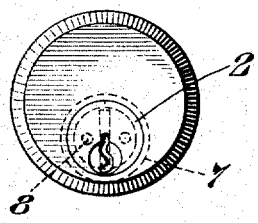
Fig. 16 is a front elevation of the same showing the key removed.
Figure 17:
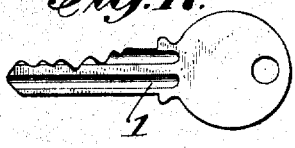
Fig. 17 is a side elevation of said key.

In the drawings, I have shown a key 1 (Fig. 17) adapted to extend into a barrel 2 (Figs. 15 and 16) arranged to rotate within an outer casing 3 which has screw-holes 4 for securing the lock within the outer portion of a door. Within the barrel casing are the usual tumblers designed for controlling the rotation of a key of this type. Secured to the rotatable barrel 2 there is a lock-operating arm 5 having an enlarged forward end 6 which is retained in engagement with the barrel 2 by means of a slotted disc 7 secured to the barrel 2 by screws 8. The lock-operating arm 5, at its rearward end, engages with a slot 9 in a rotating arm 10 pivoted in a cover plate 11 (see Fig. 12).

Figure 2:
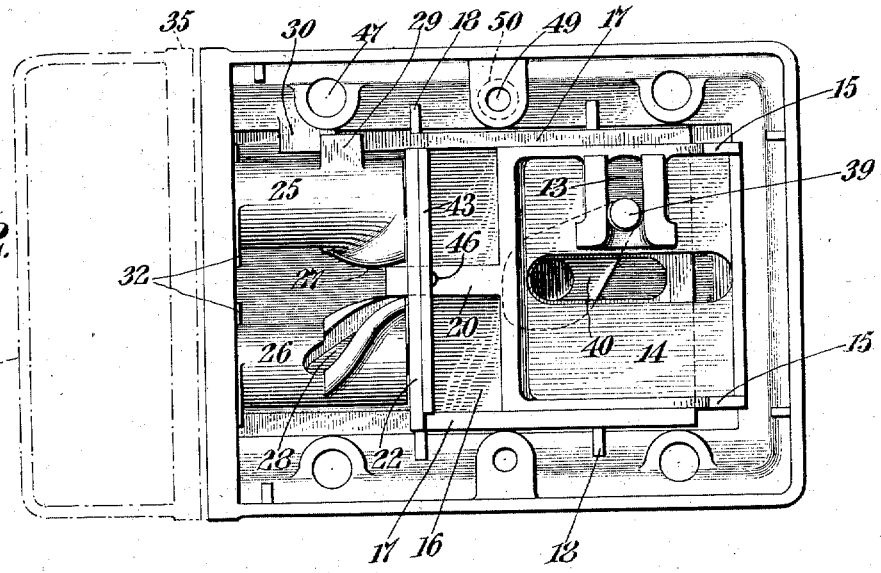
Fig. 2 is a front elevation of the interior of the locking mechanism showing the lock in unlocked position.
Figure 3:
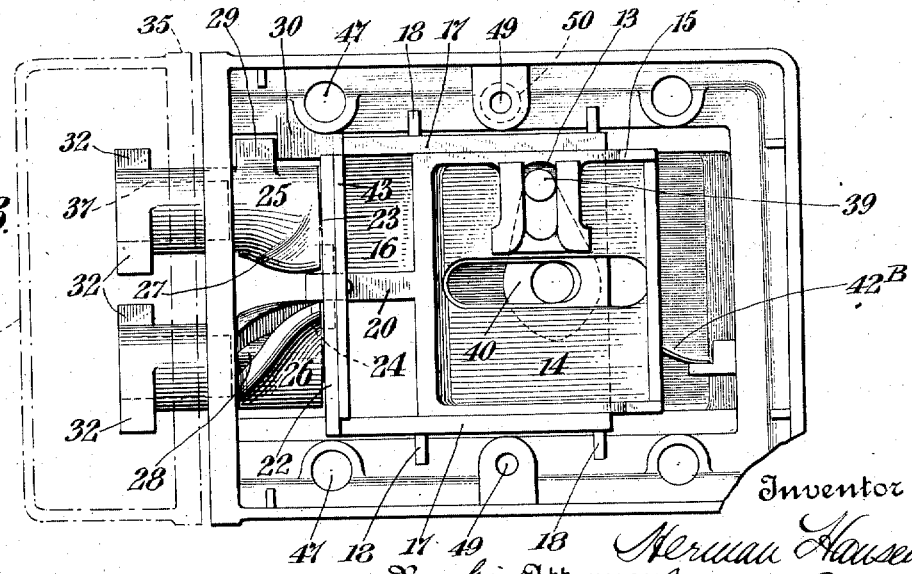
Fig. 3 is a similar view showing the bolts extended before the rotation thereof.
Figure 4:
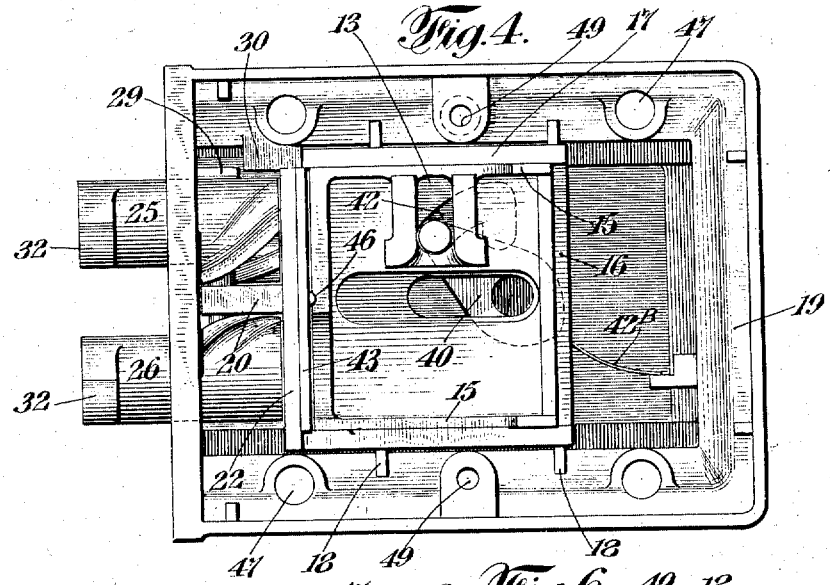
Fig. 4 is another view of the same kind but showing the bolts after having been rotated.
Figure 7:
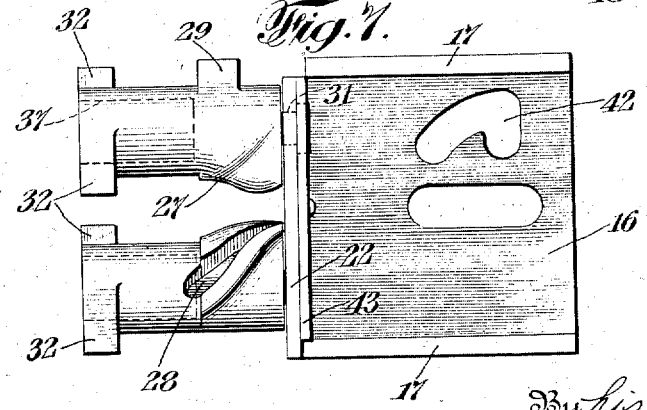
Fig. 7 is a front elevation of the main sliding plate showing the two rotatable bolts attached thereto.
Figure 8:
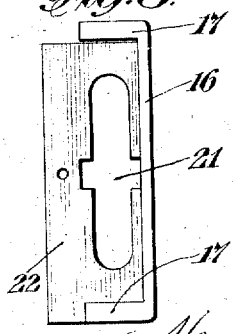
Fig. 8 is a side elevation of the same showing the bolts removed therefrom.
Figure 9:
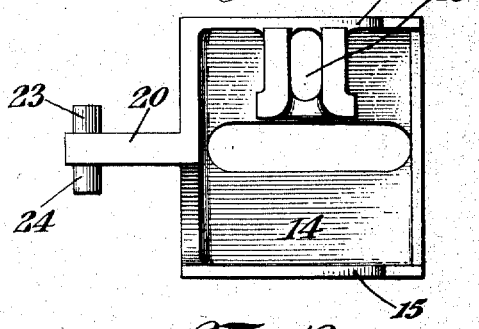
Fig. 9 is a front elevation of the auxiliary sliding plate.
Figure 10:
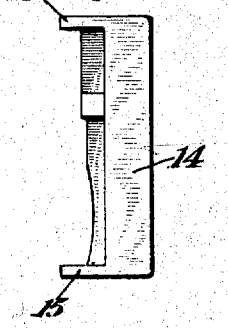
Fig. 10 is a side elevation of the same.

The arm 10, to operate the lock, is provided with a rearwardly extending crank pin 12 (Fig. 12) which is so positioned that, when the arm or crank 10 is swung about its pivot, the pin 12 enters between the raised side walls (see Fig. 9) of a slot 13 (Fig. 2) in an auxiliary sliding plate 14 having lateral upper and lower (as viewed in the drawings) guide flanges 15 (Figs. 9 and 10) guiding the said plate within a main sliding plate 16 (Figs. 2 and 7) provided with flanges 17 at the top and bottom (as viewed in the drawings) of the same which fit within guideways 18 in a lock-casing 19. At one side of the auxiliary sliding plate 14 there is an arm 20 (Fig. 9) extending through a slot 21 (Fig. 8) in the form of a cross located in a forward flange 22 on the main sliding plate 16, said arm 20 having upwardly and downwardly (as viewed in the drawings) directed pins 23 and 24 to engage with upper and lower (as viewed in the drawings) bolts 25 and 26 (Figs. 2, 3, 4 and 7) respectively which have spiral guideways 27 and 28 respectively for engagement with said pins. The upper and lower bolts 25 and 26 are constructed alike except that the upper bolt 25 has a laterally directed stop 29 to cooperate with a projection 30 in the interior of the lock-casing 19 to prevent the rotation of the bolts except when fully extended, in the manner hereinafter described.

Figure 5:
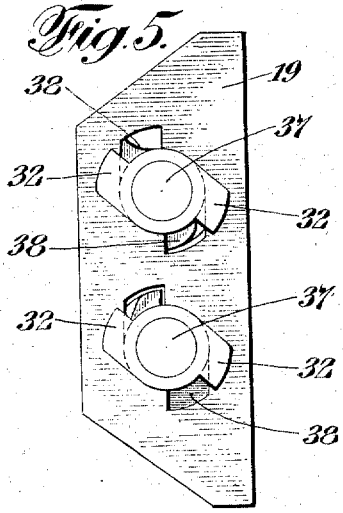
Fig. 5 is an end elevation of the locking mechanism showing the bolts extended and after having been rotated.
Figure 13:
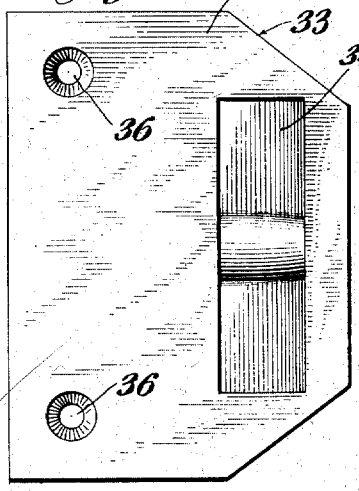
Fig. 13 is a side elevation showing the bolt-socket member.
Figure 14:
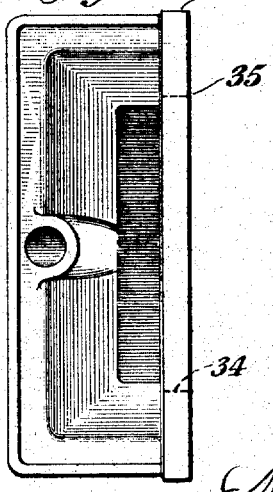
Fig. 14 is a front elevation of the same.

Each of the bolts 25 and 26 is provided with a T-shaped projection 31 which is engaged with the main sliding plate 16 by inserting the same through the slot 21 (Fig. 8) in the forward flange 22. Each of the bolts, furthermore, has at its outer end two lugs 32 at opposite sides of the bolt to engage within the interior of a bolt-socket member 33 (Figs. 13 and 14) adapted to be carried by the door casing, or frame, said bolt-socket member having a rectangular opening 34 in a plate 35. It will be noted that the bolt-socket member 33 has a plurality of screw-holes 36 for attaching it to the door casing, or frame. It will be noted, also, that each of the bolts is provided with a core 37 (Figs. 5 and 7) of hardened steel to prevent the bolts from being sawed off when extended in locking position.

Figure 1:
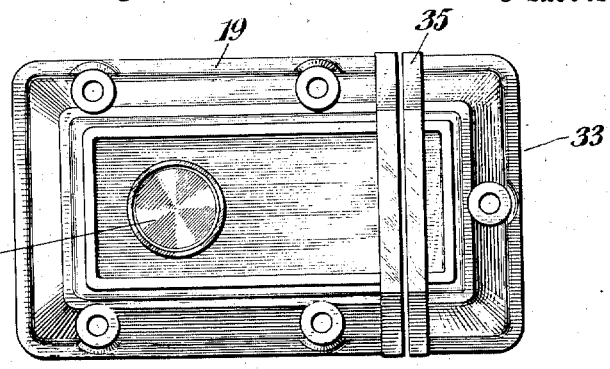
Figure 1 is a rear elevation of a lock made in accordance with my invention.
Figure 6:
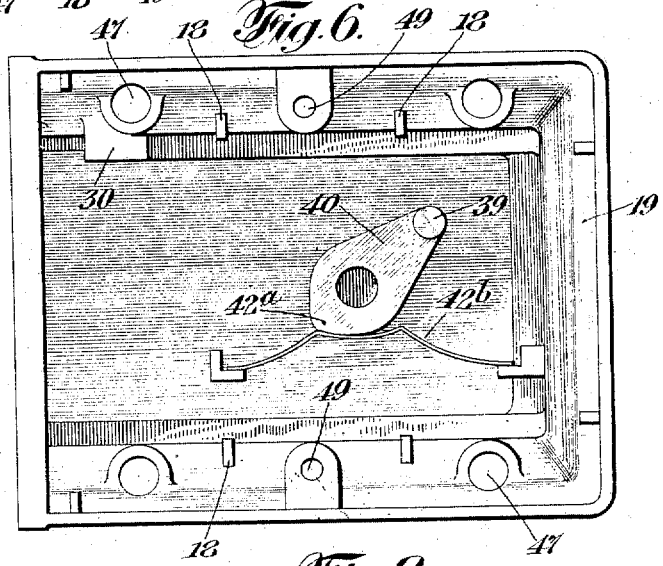
Fig. 6 is a front elevation of the interior of the lock casing showing the sliding plates removed.

When the main sliding plate carrying the upper and lower bolts 25 and 26 has been inserted into the lock-casing 19 by introducing the ends of the bolts through slots 38 in the side of the lock-casing and in such a manner that a pin 39 (Fig. 6) on an arm 40, adapted to be rotated by a knurled head 41 (Fig. 1) extending outwardly to the rear of the lock-casing, has been passed through a heart-shaped slot 42 in the main sliding plate 16, the auxiliary sliding plate 14 is introduced within the main sliding plate 16 in such a manner that the pins 23 and 24 pass through the cross-shaped slot 21 into engagement with the spiral recesses 27 and 28 on the bolts 25 and 26 and in such a manner as to bring the slot 13 over the pin 39. The arm 40, furthermore, has a slight extension 42[a] (Fig. 6) cooperating with a spring 42[b] supported within the lock-casing 19 in such a manner as to tend to retain the locking mechanism at one or the other end of its path of movement, so as to make the locking and unlocking movement smoother in operation.

Figure 11:
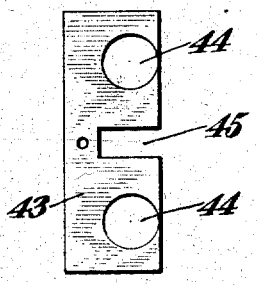
Fig. 11 is a side elevation of the retaining plate used for holding the bolts in engagement with the sliding plates.

In order to hold the two sliding plates and tumblers in engagement in this manner a retaining plate 43, (Fig. 11), having two circular openings 44 fitting over the rear ends of the bolts 25 and 26 and a recess 45 fitting over the arm 20, is secured to the forward flange 22 of the main sliding plate 16 by means of a screw 46.

It will be noted that the lock-casing 19 has a number of screw-holes 47 for securing it to the door, which is to be fastened by the lock, and that the casing 19 has screw-holes 49 and the cover plate 11 has screw-holes 49[a] so that screws 50 may be inserted for holding the cover and lock-casing together. It will be noted, also, that the cover plate 11, when held in place in the lock-casing 19 by the screws 50, also holds in their proper position the sliding plates 14 and 16 by contact with the rear portion of the auxiliary sliding plate 14.

In the operation of the lock, the key 1, being inserted in the door, will control the tumblers within the barrel 2 so as to permit the rotation of the latter and, as a result, the rotation of the lock-operating arm 5, so as to bring about the swinging of the crank pin 12 into engagement with and between the raised side walls of the slot 13 in the sliding plate 14. Assuming that the lock is in unlocked position, (as in Fig. 1), the rotating of the crank pin 12 about the axis of arm or crank 10 will cause the two sliding plates 14 and 16, as well as the bolts 25 and 26, to be moved forwardly until they reach their fully extended position. During this entire movement of the two sliding plates 14 and 16 and the bolts 25 and 26, the lateral stop 29, on the upper bolt 25, is in engagement with the projection 30 in the lock-casing so that these four parts move in unison in this portion of the movement of the locking parts.

As soon as the outermost position of extension of the bolts has been reached (as in Fig. 3), a further rotation of the key and the crank pin 12 does not result in the lateral movement of the main sliding plate 16 carrying the bolts 25 and 26 because of the fact that the lateral stop 29 is now in contact with the side (the left-hand end wall as viewed in Fig. 4) of the lock-casing but such further rotation of the key results in the movement of the auxiliary sliding plate 14 relative to the main sliding plate 16 and the consequent rotation of the bolts 25 and 26 (see Figs. 4 and 5) owing to the presence of the spiral guideways therein, which are in engagement with the upper and lower pins 23 and 24 connected to the auxiliary sliding plate. This rotation of the bolts 25 and 26 results in the lugs thereon being moved out of alinement with the rectangular opening 34 in the bolt-socket member 33 so that they engage at both sides of the same in the interior of said bolt-socket member, thus preventing the longitudinal withdrawal of said bolts 25 and 26 without first rotating them to disengage said lugs from the edges of the bolt-socket member. This rotation, furthermore, cannot be effected by merely applying a force to the periphery of the bolts owing to the particular inclination of the slots in the bolts 25 and 26. Furthermore, the bolts cannot be sawed off when so extended because of the hardened steel cores 37.

In unlocking the lock, the movement of key 1 in the reverse direction will rotate the bolts 25 and 26 until they are in alinement with the rectangular opening 34, and then withdraw the bolts within the lock-casing 19 by a reverse series of movement. Should anyone be in the interior of the room, or compartment, locked by the lock it is possible for him to release the lock by operating the knurled head 41 without the necessity of using a key.

While I have described my invention above in detail I wish it to be understood that many changes may be made therein without departing from the spirit of the same.

I claim:

1. A lock having a bolt and bolt-extending-and-rotating devices, comprising main and auxiliary sliding plates, a spiral connection between one of said plates and said bolt and a key actuated member adapted to move said plates by operating upon the plate having the spiral connection to the bolt.

2. A lock having a bolt and bolt-extending-and-rotating devices, so arranged that the bolt-rotating devices are brought into operation after the bolt-extending movement has been effected, comprising main and auxiliary sliding plates, a spiral connection between one of said plates and said bolt and a key actuated member adapted to move said plates by operating upon the plate having the spiral connection to the bolt.

3. A lock having a bolt and bolt-extending-and-rotating devices, comprising main and auxiliary sliding plates, a spiral connection between one of said plates and said bolt in the form of a spiral groove on said bolt and an extension on said auxiliary sliding plate projecting therein.

4. A lock having a bolt and bolt-extending-and-rotating devices, so arranged that the bolt-rotating devices are brought into operation after the bolt-extending movement has been effected, comprising main and auxiliary sliding plates, a spiral connection between one of said plates and said bolt in the form of a spiral channel on said bolt and an extension on said auxiliary sliding plate engaging therewith.

5. A lock having a bolt and bolt-extending-and-rotating devices, comprising main and auxiliary flat sliding plates, a spiral connection between one of said plates and said bolt in the form of a spiral guideway on said bolt, an extension on said auxiliary sliding plate engaging therewith and a stop on said bolt controlling the rotary position thereof.

6. A lock having a bolt and bolt-extending-and-rotating devices, so arranged that the bolt-rotating devices are brought into operation after the bolt-extending movement has been effected, comprising main and auxiliary sliding plates, a spiral connection between one of said plates and said bolt in the form of a spiral guideway on said bolt, an extension on said auxiliary sliding plate engaging therewith and a lug on said bolt controlling the rotary position thereof.

7. A lock having a bolt and bolt-extending-and-rotating devices, comprising main and auxiliary sliding plates and a spiral connection between one of said plates and said bolt, the bolt being attached to the main sliding plate and the auxiliary plate being movable with regard thereto and having an arm extending into engagement with said bolt.

8. A lock having a bolt and bolt-extending-and-rotating devices, so arranged that the bolt-rotating devices are brought into operation after the bolt-extending movement has been effected, comprising main and auxiliary sliding plates and a spiral connection between one of said plates and said bolt, the bolt being attached to the main sliding plate and the auxiliary plate being movable with regard thereto and having an arm extending into engagement with said bolt.

9. A lock having a bolt and bolt-extending-and-rotating devices, comprising main and auxiliary sliding plates and a spiral connection between one of said plates and said bolt in the form of a spiral guideway on said bolt and a lug on said auxiliary sliding plate engaging therewith, the bolt being attached to the main sliding plate and the auxiliary plate being movable with regard thereto.

10. A lock having a bolt and bolt-extending-and-rotating devices, so arranged that the bolt-rotating devices are brought into operation after the bolt-extending movement has been effected, comprising main and auxiliary sliding plates and a spiral connection between one of said plates and said bolt in the form of a spiral guideway on said bolt and an extension on said auxiliary sliding plate engaging therewith, the bolt being attached to the main sliding plate and the auxiliary plate being movable with regard thereto.

11. A lock having a bolt and bolt-extending-and-rotating devices, comprising main and auxiliary sliding plates and a spiral connection between one of said plates and said bolt in the form of a spiral guideway on said bolt, an extension on said auxiliary sliding plate engaging therewith and a lug on said bolt controlling the rotary position thereof, the bolt being attached to the main sliding plate and the auxiliary plate being movable with regard thereto.

12. A lock having a bolt and bolt-extending-and-rotating devices, so arranged that the bolt-rotating devices are brought into operation after the bolt-extending movement has been effected, comprising main and auxiliary sliding plates and a spiral connection between one of said plates and said bolt in the form of a spiral guideway on said bolt, an extension on said auxiliary sliding plate engaging therewith and a stop on said bolt controlling the rotary position thereof, the bolt being attached to the main sliding plate and the auxiliary plate being movable with regard thereto.

13. A lock having a plurality of bolts and bolt-extending-and-rotating devices, comprising main and auxiliary sliding plates and a spiral connection between one of said plates and said bolts, the bolts being carried by the main sliding plate and the auxiliary plate being movable with regard thereto and having an arm extending into engagement with said bolts, and a locking plate for securing the bolts and sliding plates together.

14. A lock having a plurality of bolts and bolt-extending-and-rotating devices, so arranged that the bolt-rotating devices are brought into operation after the bolt-extending movement has been effected, comprising main and auxiliary sliding plates and a spiral connection between one of said plates and said bolts, the bolts being carried by the main sliding plate and the auxiliary plate being movable with regard thereto and having an arm extending into engagement with said bolts, and a locking plate for securing the bolts and sliding plates together.

15. A lock having a plurality of bolts and bolt-extending-and-rotating devices, comprising main and auxiliary sliding plates and a spiral connection between one of said plates and said bolts in the form of a spiral guideway on the bolts and an extension on said auxiliary sliding plate engaging therewith, the bolts being carried by the main sliding plate and the auxiliary plate being movable with regard thereto, and a locking plate for securing the bolts and sliding plates together.

16. A lock having a plurality of bolts and bolt-extending-and-rotating devices, so arranged that the bolt-rotating devices are brought into operation after the bolt-extending movement has been effected, comprising main and auxiliary sliding plates and a spiral connection between one of said plates and said bolts in the form of a spiral guideway on said bolts and an extension on said auxiliary sliding plate engaging therewith, the bolts being carried by the main sliding plate and the auxiliary plate being movable with regard thereto, and a locking plate for securing the bolts and sliding plates together.

17. A lock having a plurality of bolts and bolt-extending-and-rotating devices, comprising main and auxiliary sliding plates and a spiral connection between one of said plates and said bolts in the form of a spiral guideway on said bolts, an extension on said auxiliary sliding plate engaging therewith and a stop on said bolts controlling the rotary position thereof, the bolts being carried by the main sliding plate and the auxiliary plate being movable with regard thereto, and a locking plate for securing the bolts and sliding plates together.

18. A lock having a plurality of bolts and bolt-extending-and-rotating devices, so arranged that the bolt-rotating devices are brought into operation after the bolt-extending movement has been effected, comprising main and auxiliary sliding plates and a spiral connection between one of said plates and said bolts in the form of a spiral guideway on said bolts, an extension on said auxiliary sliding plates engaging therewith and a stop on said bolts controlling the rotary position thereof, the bolts being carried by the main sliding plate and the auxiliary plate being movable with regard thereto, and a locking plate for securing the bolts and sliding plates together.

19. A lock having a bolt, and bolt extending and rotating devices comprising main and auxiliary sliding plates, a spiral connection between one of said plates and said bolt, the latter having a hard steel core adjacent exposed portions of the bolt when in locking position, and a key actuated member adapted to move said plates by operating upon the plate having the spiral connection to the bolt.

20. A lock having a plurality of bolts and bolt extending and rotating devices for operating the same, comprising main and auxiliary sliding plates, and spiral connections between one of said plates and said bolts.

21. A lock having a bolt, means including a plate for controlling the forward direction of movement of the bolt, a sliding plate having a spiral connection with said bolt for rotating the same, and an oscillating crank for controlling the movement of the sliding plate.

22. A lock casing having a rotatable bolt extendible out of said casing; a projection upon the bolt; means for controlling the forward direction of movement of the bolt, said means including a plate forming a wall of said casing and provided with guiding means along which the projection on the bolt moves as the latter is extended, said guiding means being shaped to prevent the rotation of the bolt until the latter has been extended sufficiently to carry said projection beyond said guiding means; a sliding plate slidably guided within said casing and having a spiral connection with said bolt for rotating the same; a crank arm pivotally mounted in the front wall of said casing; a crank arm pivotally mounted in the back wall of said casing; means for connecting each crank arm to said slidable plate; and a single spring means for effecting a completion of the sliding movement of said slidable plate in response to actuation of the latter by either of said crank arms.

23. A lock casing having a rotatable bolt extendible out of said casing; a projection upon the bolt; means for controlling the forward direction of movement of the bolt, said means including a plate forming a wall of said casing and provided with guiding means along which the projection on the bolt moves as the latter is extended, said guiding means being shaped to prevent the rotation of the bolt until the latter has been extended sufficiently to carry said projection beyond said guiding means; a sliding plate slidably guided within said casing and having a spiral connection with said bolt for rotating the same; a crank arm pivotally mounted in the front wall of said casing, said crank arm having connection with said slidable plate; a detachable cover plate for said casing; a crank arm pivotally mounted therein; and means for making detachable connection between said sliding plate and said last-mentioned crank arm.

24. A lock casing having a rotatable bolt extendible out of said casing; a projection upon the bolt; means for controlling the forward direction of movement of the bolt, said means including a plate forming a wall of said casing and provided with guiding means along which the projection on the bolt moves as the latter is extended, said guiding means being shaped to prevent the rotation of the bolt until the latter has been extended sufficiently to carry said projection beyond said guiding means; a sliding plate slidably guided within said casing and having a spiral connection with said bolt for rotating the same, said sliding plate having a slot extending substantially transversely to its direction of movement; and a crank arm pivotally mounted in a wall of said casing and having a crank pin for engagement in said slot for effecting sliding movement of said plate.

25. A lock casing having a rotatable bolt extendible out of said casing; a projection upon the bolt; means for controlling the forward direction of movement of the bolt, said means including a plate forming a wall of said casing and provided with guiding means along which the projection on the bolt moves as the latter is extended, said guiding means being shaped to prevent the rotation of the bolt until the latter has been extended sufficiently to carry said projection beyond said guiding means; a sliding plate slidably guided within said casing and having a spiral connection with said bolt for rotating the same, said sliding plate having a slot extending substantially transversely to its direction of movement; a crank arm pivotally mounted in a wall of said casing and having a crank pin for engagement in said slot for effecting sliding movement of said plate; and a spring operating upon said crank arm to cause the latter to complete its movement about its pivot and to effect completion of the sliding movement of said sliding plate 26. A lock casing having a rotatable bolt extendible out of said casing; a projection upon the bolt; means for controlling the forward direction of movement of the bolt, said means including a plate forming a wall of said casing and provided with guiding means along which the projection on the bolt moves as the latter is extended, said guiding means being shaped to prevent the rotation of the bolt until the latter has been extended sufficiently to carry said projection beyond said guiding means; a sliding plate slidably guided within said casing and having a spiral connection with said bolt for rotating the same; a crank arm pivotally mounted in the front wall of said casing, said crank arm having connection with said slidable plate; a detachable cover plate for said casing; a crank arm pivotally mounted therein; means for making detachable connection between said sliding plate and said last-mentioned crank arm; and a single spring means for causing both cranks to complete their effective movements about their respective pivots.

27. A lock casing having a rotatable bolt extendible out of said casing; a projection upon the bolt; means for controlling the forward direction of movement of the bolt, said means including a plate forming a wall of said casing and provided with guiding means along which the projection on the bolt moves as the latter is extended, said guiding means being shaped to prevent the rotation of the bolt until the latter has been extended sufficiently to carry said projection beyond said guiding means; a sliding plate slidably guided within said casing and having a spiral connection with said bolt for rotating the same; a crank arm pivotally mounted in the front wall of said casing; a crank arm pivotally mounted in the back wall of said casing; means for connecting each crank arm to said slidable plate; and a single spring means connected to cause each crank to complete its effective movement about its pivot.

28. A lock casing having a rotatable bolt extendible out of said casing; a projection upon the bolt; means for controlling the forward direction of movement of the bolt, said means including a plate forming a wall of said casing and provided with guiding means along which the projection on the bolt moves as the latter is extended, said guiding means being shaped to prevent the rotation of the bolt until the latter has been extended sufficiently to carry said projection beyond said guiding means; a sliding plate slidably guided within said casing and having a spiral connection with said bolt for rotating the same; a crank arm pivotally mounted in the front wall of said casing; a crank arm pivotally mounted in the back wall of said casing; means for connecting each crank arm to said slidable plate, said crank arms and said slidable plate being related so that the complete range of movement of the latter is effected by either of said cranks by a range of oscillating movement from one side of its pivot to the other side of the pivot; and spring means for urging said cranks, when they are operated, to complete their respective ranges of movement and operative irrespective of whether said cranks are operated in locking or unlocking direction.

29. A lock casing having two rotatable bolts extendible out of said casing; means for controlling the forward direction of movement of the bolts, said means including a plate forming a wall of said casing; a sliding plate slidably guided relative to said first-mentioned plate and having a portion extended toward and substantially centrally of said bolts, said extended portion carrying means having a spiral slot and pin connection with said bolts for rotating the same.

30. A lock casing having two rotatable bolts extendible out of said casing; means for controlling the forward direction of movement of the bolts, said means including a plate forming a wall of said casing; a sliding plate slidably guided relative to said first-mentioned plate and having a portion extended toward and substantially centrally of said bolts, said extended portion carrying means having a spiral slot and pin connection with said bolts for rotating the same, and means restricting the range of extending movement of said two bolts to one that is less than the range of sliding movement of said sliding plate, thereby to enforce relative movement between said bolts and said sliding plate during a portion of the movement of the latter.

31. A lock casing having two rotatable bolts extendible out of said casing; means for controlling the forward direction of movement of the bolts, said means including a plate forming a wall of said casing; a sliding plate slidably guided relative to said first-mentioned plate and having a portion extended toward and substantially centrally of said bolts, said extended portion carrying means having a spiral slot and pin connection with said bolts for rotating the same, a crank for actuating said sliding plate, said crank being pivotally mounted in said first-mentioned plate and having a crank pin upon its one end, said slidable plate having a transversely extending slot with which said crank pin engages.

32. A lock casing having two rotatable bolts extendible out of said casing; means for controlling the forward direction of movement of the bolts, said means including a plate forming a wall of said casing; a sliding plate slidably guided relative to said first-mentioned plate and having a portion extended toward and substantially centrally of said bolts, said extended portion carrying means having a spiral slot and pin connection with said bolts for rotating the same, and means movable with said sliding plate for rotatably supporting said bolts.

33. A lock casing having two rotatable bolts extendible out of said casing; means for controlling the forward direction of movement of the bolts, said means including a plate forming a wall of said casing; a sliding plate slidably guided relative to said first-mentioned plate and having a portion extended toward and substantially centrally of said bolts, said extended portion carrying means having a spiral slot and pin connection with said bolts for rotating the same, and means movable with said sliding plate and extending in the direction of movement of said bolts and providing bearing means for rotatably supporting said bolts.

34. A lock casing having two rotatable bolts extendible out of said casing; means for controlling the forward direction of movement of the bolts, said means including a plate forming a wall of said casing; a sliding plate slidably guided relative to said first-mentioned plate and having a portion extended toward and substantially centrally of said bolts, said extended portion carrying means having a spiral slot and pin connection with said bolts for rotating the same, a crank for actuating said sliding plate, said crank being pivotally mounted in said first-mentioned plate and having a range of movement to either side of its axis, said crank being connected to said sliding plate to move the latter; and spring means acting upon said crank to cause the latter to complete its movements to either side of its axis.

35. A lock casing having two rotatable bolts extendible out of said casing; means for controlling the forward direction of movement of the bolts, said means including a plate forming a wall of said casing; a sliding plate slidably guided relative to said first-mentioned plate and having a portion extended toward and substantially centrally of said bolts, said extended portion carrying means having a spiral slot and pin connection with said bolts for rotating the same, a crank for actuating said sliding plate, said crank being pivotally mounted in said first-mentioned plate and having a range of movement to either side of its axis, said crank being connected to said sliding plate to move the latter; and a single spring mounted to react between one of said plates and said crank and acting to cause said crank to complete its movements to either side of its axis.

36. A lock casing having two rotatable bolts extendible out of said casing; means for controlling the forward direction of movement of the bolts, said means including a plate forming a wall of said casing; a sliding plate slidably guided relative to said first-mentioned plate and having a portion extended toward and substantially centrally of said bolts, said extended portion carrying means having a spiral slot and pin connection with said bolts for rotating the same, a crank for actuating said sliding plate, said crank being pivotally mounted in said first-mentioned plate and having a range of movement to either side of its axis, said crank being connected to said sliding plate to move the latter; and a spring acting upon said crank and connected therewith so that the effective arm through which the spring acts increases as the effective arm of said crank decreases.

37. A lock casing having two rotatable bolts extendible out of said casing; means for controlling the forward direction of movement of the bolts, said means including a plate forming a wall of said casing; a sliding plate slidably guided relative to said first-mentioned plate and having a portion extended toward and substantially centrally of said bolts, said extended portion carrying means having a spiral slot and pin connection with said bolts for rotating the same; and means extending transversely of said extended portion of said slidable plate for rotatably supporting said bolts.

38. A lock casing having a rotatable bolt extendible out of said casing; a projection upon the bolt; means for controlling the forward direction of movement of the bolt, said means including a plate forming a wall of said casing and provided with guiding means along which the projection on the bolt moves as the latter is extended, said guiding means being shaped to prevent rotation of the bolt until the latter has been extended sufficiently out of the casing; a sliding plate slidably guided within said casing and having a spiral connection with said bolt for rotating the same upon relative movement therebetween; a crank arm for moving said sliding plate; and a spring acting upon said crank and connected therewith so that the effective arm through which the spring acts increases as the effective arm of said crank decreases.

39. A lock casing having a rotatable bolt extendible out of said casing; a projection upon the bolt; means for controlling the forward direction of movement of the bolt, said means including a plate forming a wall of said casing and provided with guiding means along which the projection on the bolt moves as the latter is extended, said guiding means being shaped to prevent rotation of the bolt until the latter has been extended sufficiently out of the casing; a sliding plate slidably guided within said casing and having a spiral connection with said bolt for rotating the same upon relative movement therebetween; a crank arm for moving said sliding plate; a crank arm pivotally supported by said casing and having a crank pin, said sliding plate having a transversely extending slot with which said pin engages and said crank having a range of oscillating movement to either side of its axis; and spring means acting upon said crank and connected therewith so that the effective arm through which said spring means acts increases as the effective arm of said crank decreases.

40. A lock casing having a rotatable bolt extendible out of said casing; a sliding plate lying substantially in a plane substantially parallel to the front wall of said casing and having a spiral connection with said bolt for rotating the same upon relative movement therebetween; and means for controlling the forward direction of movement of the bolt including a plate substantially parallel to said sliding plate, said second-mentioned plate being constructed and arranged to prevent relative movement between said sliding plate and said bolt until the latter has been extended a predetermined distance out of said casing.

41. A lock casing having a rotatable bolt extendible out of the casing and having guideways extending in the direction in which said bolt is extendible; a sliding plate slidably mounted relative to said guideways and provided with means at one end to assist in rotatably supporting said bolt and with means forming a spiral connection with said bolt for rotating the same upon relative movement therebetween; means including a plate constructed and arranged to prevent said relative movement from taking place until said bolt has been extended a predetermined distance out of said casing and adapted thereby for controlling the forward direction of movement of the bolt.

42. A lock casing having a rotatable bolt extendible out of said casing; a crank pivotally supported by a wall of said casing and having a bearing member passing through the latter to permit operation of the crank from the exterior of said casing; a sliding plate movable by said crank and having a connection therewith so as to partake of the full range of movement of the crank and having a spiral connection with said bolt for rotating the same upon relative movement therebetween; and means including a plate coacting with said sliding plate in the control of said bolt, said second-mentioned plate extending substantially parallel to said sliding plate and acting to prevent relative movement between the latter and the bolt until the bolt has been extended a predetermined distance out of said casing and thereby controlling the forward direction of movement of the bolt.

43. A lock casing having a rotatable bolt extendible out of said casing; a crank pivotally supported by a wall of said casing and having a bearing member passing through the latter to permit operation of the crank from the exterior of said casing; a sliding plate movable by said crank and having a connection therewith so as to partake of the full range of movement of the crank and having a spiral connection with said bolt for rotating the same upon relative movement therebetween; and means including a plate coacting with said sliding plate in the control of said bolt, said second-mentioned plate extending substantially parallel to said sliding plate and acting to prevent relative movement between the latter and the bolt until the bolt has been extended a predetermined distance out of said casing and thereby controlling the forward direction of movement of the bolt; and a spring for causing the completion of the sliding movements, in either locking or unlocking direction, of said sliding plate 44. A lock casing having a pair of bolts, each provided with a lateral extension, adapted to be extended out of an end wall of the casing; a main sliding plate slidably supported within said casing and having said bolts pivotally secured thereto; and an auxiliary plate slidable relative to said main plate, said auxiliary plate and said bolts having cam connections therebetween adapted upon relative movement between said plates to effect movement of said bolts about their pivots, thereby to swing the lateral projections on the bolts about the pivots of the latter.

45. A lock casing having a pair of bolts, each provided with a lateral extension, adapted to be extended out of an end wall of the casing; a main sliding plate slidably supported within said casing and having said bolts pivotally secured thereto; an auxiliary plate slidable relative to said main plate, said auxiliary plate and said bolts having cam connections therebetween adapted upon relative movement between said plates to effect movement of said bolts about their pivots, thereby to swing the lateral projections on the bolts about the pivots of the latter; and means for limiting the slidable movement of said main plate to a range less than that of said auxiliary plate, thereby to effect relative slidable movement therebetween.

46. A lock casing having a pair of bolts, each provided with a lateral extension, adapted to be extended out of an end wall of the casing; a main sliding plate slidably supported within said casing and having said bolts pivotally secured thereto; an auxiliary plate slidable relative to said main plate, said auxiliary plate and said bolts having cam connections therebetween adapted upon relative movement between said plates to effect movement of said bolts about their pivots, thereby to swing the lateral projections on the bolts about the pivots of the latter; means operable from the exterior of said casing for effecting movement of said slidable plates, thereby to effect movement of said bolts out of or into said casing; and means for limiting the slidable movement of said main plate, thereby to cause said operating means to move said auxiliary plate relative to said main plate and hence relative to said bolts.

47. A lock casing having a pair of bolts, each provided with a lateral extension, adapted to be extended out of an end wall of the casing; a main sliding plate slidably supported within said casing and having said bolts pivotally secured thereto; an auxiliary plate slidable relative to said main plate, said auxiliary plate and said bolts having cam connections therebetween adapted upon relative movement between said plates to effect movement of said bolts about their pivots, thereby to swing the lateral projections on the bolts about the pivots of the latter; means operable from the exterior of said casing for effecting movement of said slidable plates, thereby to effect movement of said bolts out of or into said casing; and a stop on one of said bolts adapted to engage the end wall of said casing through which said bolts are extended, thereby to limit the sliding movement of said main plate and hence to limit the extending movement of said bolts, said operating means acting thereafter to move said auxiliary sliding plate relative to said main sliding plate, said cam means being thereby made effective to swing said bolts and the lateral extensions thereon about their pivots.

48. A lock having a bolt and bolt extending and rotating devices, said devices including main and auxiliary sliding plates, said bolt being pivotally attached to the main sliding plate and the auxiliary plate being movable with respect to said main sliding plate, an arm on said auxiliary plate and extending in the direction of said bolt, and cam means forming a connection between said bolt and said arm and adapted upon relative movement between said auxiliary plate and said bolt to swing the latter about its pivot.

49. A lock casing having a pair of bolts each provided with a lateral projection adjacent its outer end and adapted to be moved out of an end wall of said casing; a main sliding plate within said casing and having said bolts pivotally mounted with respect thereto; and an auxiliary sliding plate having an arm extending substantially between said bolts, said arm and said bolts having coacting portions adapted upon relative movement between said sliding plate and said bolts to cause said bolts to swing about their pivots.

50. A lock casing having a pair of bolts each provided with a lateral projection adjacent its outer end and adapted to be moved out of an end wall of said casing; a main sliding plate within said casing and having said bolts pivotally mounted with respect thereto; and an auxiliary sliding plate having an arm extending substantially between said bolts, said arm and said bolts having coacting portions adapted upon relative movement between said sliding plate and said bolts to cause said bolts to swing about their pivots, said coacting portions being constructed to prevent swinging of said bolts about their pivots in reverse direction unless relative movement therebetween takes place.

51. A lock casing having an end wall provided with an opening and being open at its back; a bolt extendible out of said casing and through said opening in the end wall thereof; guide-portions in said casing; a main sliding plate slidably guided by said guide-portions and having said bolt pivotally secured thereto; an auxiliary plate slidable relative to said main plate, said auxiliary plate and said bolt having coacting cam portions adapted upon relative movement between said plates to effect movement of said bolt about its pivot; and a cover plate attachable to said casing for holding said main sliding plate in operative relation to said guide-portions.

52. A lock casing having a front wall, an end wall with an opening therein, and being open at its back; a bolt extendible out of the opening in said end wall; a crank arm pivotally mounted in said front wall and operable from the exterior of said casing; guide-portions in said casing; a main sliding plate slidably guided by said guide-portions, said bolt being pivotally secured to said plate; an auxiliary plate slidably supported by said main sliding plate and making detachable connection with said crank arm, said auxiliary sliding plate and said bolt having cam connections adapted upon relative movement between said plates to swing said bolt about its pivot; and a cover plate attachable to said casing for holding said main sliding plate in operative relation to said guide portions and for preventing movement of said auxiliary sliding plate in a direction to effect disengagement thereby from said crank arm.

53. A lock casing having an end wall provided with an opening and being open at its back; a bolt extendible out of said casing and through said opening in the end wall thereof; guide-portions in said casing; a main sliding plate slidably guided by said guide-portions and having said bolt pivotally secured thereto; an auxiliary plate slidable relative to said main plate, said auxiliary plate and said bolt having coacting cam portions adapted upon relative movement between said plates to effect movement of said bolt about its pivot; a cover plate attachable to said casing for holding said main sliding plate in operative relation to said guide-portions; and a crank arm pivotally mounted on said cover plate and making detachable connection with one of said sliding plates for actuating the latter from the exterior of said casing.

54. A lock casing having a front wall, an end wall with an opening therein, and being open at its back; a bolt extendible out of the opening in said end wall; a crank arm pivotally mounted in said front wall and operable from the exterior of said casing; guide-portions in said casing; a main sliding plate slidably guided by said guide-portions, said bolt being pivotally secured to said plate; an auxiliary plate slidably supported by said main sliding plate and making detachable connection with said crank arm, said auxiliary sliding plate and said bolt having cam connections adapted upon relative movement between said plates to swing said bolt about its pivot; a cover plate attachable to said casing for holding said main sliding plate in operative relation to said guide portions and for preventing movement of said auxiliary sliding plate in a direction to effect disengagement thereby from said crank arm; and a crank arm pivotally mounted on said cover plate and making detachable connection with said auxiliary sliding plate for actuating the latter from the exterior of said casing.

55. A lock casing having a front wall, an end wall with an opening therein, and being open at its back; a bolt extendible out of the opening in said end wall; a crank arm pivotally mounted in said front wall and operable from the exterior of said casing; a main sliding plate slidably supported in said casing and having said bolt pivotally secured thereto; an auxiliary sliding plate in said casing, said auxiliary plate and said bolt having cam connections adapted upon relative movement between said plates to swing said bolt about its pivot; and a cover plate having a crank arm pivotally mounted thereon and acting to hold said plates in position in said casing, each of said crank arms making detachable connection with said auxiliary sliding plate.

56. A lock casing having a front wall, an end wall with an opening therein, and being open at its back; a bolt extendible out of the opening in said end wall; a crank arm pivotally mounted in said front wall and operable from the exterior of said casing; a main sliding plate slidably supported in said casing and having said bolt pivotally secured thereto; an auxiliary sliding plate in said casing, said auxiliary plate and said bolt having cam connections adapted upon relative movement between said plates to swing said bolt about its pivot; and a cover plate having a crank arm pivotally mounted thereon and acting to hold said plates in position in said casing, said auxiliary sliding plate being provided with a transversely extending slot with which the end portions of each of said crank arms make detachable connection.

57. A lock casing having an end wall provided with an opening and being open at its back; a bolt extendible out of said casing and through said opening in the end wall thereof; guide-portions in said casing; a main sliding plate slidably guided by said guide-portions and having said bolt pivotally secured thereto; an auxiliary plate slidable relative to said main plate, said auxiliary plate and said bolt having coacting cam portions adapted upon relative movement between said plates to effect movement of said bolt about its pivot; spring means for insuring the completion of the relative movement between said plates; and a cover plate attachable to said casing for holding said main sliding plate in operative relation to said guide-portions.

58. A lock casing having a front wall an end wall with an opening therein, and being open at its back; a bolt extendible out of the opening in said end wall; a crank arm pivotally mounted in said front wall and operable from the exterior of said casing; a main sliding plate slidably supported in said casing and having said bolt pivotally secured thereto; an auxiliary sliding plate in said casing, said auxiliary plate and said bolt having cam connections adapted upon relative movement between said plates to swing said bolt about its pivot; a spring arranged to react between said casing and said crank arm to cause the completion of the oscillating movements of the latter; and a cover plate attachable to said casing and acting to hold said plates in position in said casing.

59. A lock casing having a pair of bolts, each provided with a lateral projection, adapted to be extended out of an end wall of said casing; a main sliding plate slidably supported within said casing and having said bolts pivotally secured thereto; an auxiliary plate slidable relative to said main plate and having an extension extending lengthwise of said bolts and substantially in a plane intermediate of said bolts, said bolts and said extension having coacting portions adapted upon relative movement between said auxiliary plate and said bolts to swing the latter about their pivots; operating means for moving said auxiliary plate; and means for causing said main plate to move therewith but only throughout a portion of the range of movement of said auxiliary plate.

60. A lock casing having a pair of bolts, each provided with a lateral projection, adapted to be extended out of an end wall of said casing; a main sliding plate slidably supported within said casing and having said bolts pivotally secured thereto; an auxiliary plate slidable relative to said main plate and having an extension extending lengthwise of said bolts and substantially in a plane intermediate of said bolts, said bolts and said extension having coacting portions adapted upon relative movement between said auxiliary plate and said bolts to swing the latter about their pivots; operating means for controlling the operation of said bolts in either locking or unlocking direction; and means responsive to said operating means for causing said two plates to move together and then said auxiliary plate relative to the main plate when operating in locking direction and for causing first a movement of said auxiliary plate relative to said main plate and then a movement of both plates together when operating in unlocking direction.

61. A lock casing having a pair of bolts, each provided with a lateral projection, adapted to be extended out of an end wall of said casing; a main sliding plate slidably supported within said casing and having said bolts pivotally secured thereto; an auxiliary plate slidable relative to said main plate and having an extension extending lengthwise of said bolts and substantially in a plane intermediate of said bolts, said bolts and said extension having coacting portions adapted upon relative movement between said auxiliary plate and said bolts to swing the latter about their pivots; a crank arm operable from the exterior of said casing; and connections between said crank arm and said plates for causing sequentially joint and relative movements of said plates.

62. A lock casing having a front plate, a detachable back plate, and an end wall provided with an opening having arcuate portions for rotatably supporting a bolt of round cross-section and a recess adapted to receive a laterally directed lug upon the outer end of the bolt; and bolt extending and rotating means, said means including a sliding and reciprocable plate having a spiral connection with said bolt and adapted upon relative movement between the bolt and itself to rotate the bolt, said plate having a slot extending substantially transversely of the axis of said bolt, a crank rotatably mounted in said front plate and having a crank pin extending through said slot in said slidable plate, a crank rotatably mounted in said back plate and having a crank pin upon the end thereof, means forming a detachable connection between said last-mentioned crank pin and said slidable plate, a projection upon a portion of said bolt that is within said casing, and means including a plate member supported by one of said casing plates for controlling the forward direction of movement of said bolt, said plate member being shaped to restrain rotation of said bolt until the latter has been moved out of the casing to a predetermined extent and thereafter to permit rotation of the bolt to take place in response to relative movement between said slidable plate and said bolt.

63. A lock casing having a front plate, a detachable back plate, and an end wall provided with an opening having arcuate portions for rotatably supporting a bolt of round cross-section and a recess adapted to receive a laterally directed lug upon the outer end of the bolt; and bolt extending and rotating means said means including a sliding and reciprocable plate having a spiral connection with said bolt and adapted upon relative movement between the bolt and itself to rotate the bolt, said plate having a slot extending substantially transversely of the axis of said bolt, a crank rotatably mounted in said front plate and having a crank pin extending through said slot in said slidable plate, a crank rotatably mounted in said back plate and having a crank pin upon the end thereof, means forming a detachable connection between said last-mentioned crank pin and said slidable plate, a projection upon a portion of said bolt that is within said casing, means including a plate member supported by one of said casing plates for controlling the forward direction of movement of said bolt, said plate member being shaped to restrain rotation of said bolt until the latter has been moved out of the casing to a predetermined extent and thereafter to permit rotation of the bolt to take place in response to relative movement between said slidable plate and said bolt; and spring means for causing the completion of the reciprocating movements of said sliding plate.

64. A lock casing having a rotatable bolt extendible out of said casing; a main sliding plate with which said bolt is rotatably connected; an auxiliary sliding plate having a spiral connection with said bolt, said connection comprising a spiral guideway on said bolt and an extension on said auxiliary plate engaging therewith; and a locking plate for holding said rotatable connection and said spiral connection intact.

65. A lock casing having a rotatable bolt extendible out of said casing; a main sliding plate having an upstanding flange at its forward end provided with a slot-like recess, said bolt having a restricted portion intermediate its ends for fitting into said recess; and a locking plate secured to said sliding plate and having an opening therein for receiving the inner end portion of said bolt, thereby to prevent the latter from moving laterally out of said recess.

66. A lock casing having a rotatable bolt member extendible out of said casing; a sliding plate member within said casing, one of said members having a spiral slot and the other having a projection adapted to ride in said slot upon relative lengthwise movement between said members; and means for preventing disengagement of said projection from said slot comprising a plate shaped to prevent relative lateral movement of one of said members away from the other.

67. A lock casing having a rotatable bolt member extendible out of said casing; a sliding plate member within said casing, one of said members having a spiral slot and the other having a projection adapted to ride in said slot upon relative lengthwise movement between said members, said plate member being shaped to assist in rotatably supporting said bolt; and a locking plate shaped to coact in rotatably supporting said bolt and to hold said two members against relative lateral displacement for preventing disengagement of said projection from said spiral slot.

68. A lock casing having a rotatable bolt member extendible out of said casing; a sliding plate member within said casing, one of said members having a spiral slot and the other having a projection adapted to ride in said slot upon relative lengthwise movement between said members, said plate member being shaped to assist in rotatably supporting said bolt; a locking plate shaped to coact in rotatably supporting said bolt and to hold said two members against relative lateral displacement for preventing disengagement of said projection from said spiral slot; and means detachably holding said locking plate in position, thereby to permit disassembly of said members.

69. A lock casing having a rotatable bolt member extendible out of said casing; a sliding plate member within said casing; one of said members having a spiral slot and the other having a projection adapted to ride in said slot upon relative lengthwise movement between said members; said plate member having an arcuate portion against which said bolt rests for rotatable support; and a locking plate having an arcuate portion for engagement with said bolt and forming with said other arcuate portion a bearing for rotatably supporting said bolt, said locking plate acting thereby to prevent lateral displacement of said bolt from said plate member and thus to prevent disengagement of said projection from said slot.

70. A lock casing having a substantially cylindrical rotatable bolt member extendible out of said casing; a sliding plate member having a spiral connection with said bolt member for rotating the same upon relative movement therebetween, said connection comprising a spiral slot in one of said members and a projection on the other member engaged therewith; means including a plate for controlling the forward direction of movement of the bolt member and with respect to which plate said plate member is slidable, said plate having a portion for assisting in rotatably supporting said bolt member and to prevent relative lateral displacement between said two members, thereby to hold said spiral connection intact.

71. A lock casing having a rotatable bolt extendible out of said casing; means including a sliding plate for controlling the forward direction of movement of the bolt, said plate having bearing means for rotatably supporting the bolt and adapted to carry said bolt forward upon movement of said plate; and a sliding plate having a spiral connection with said bolt for rotating the same upon relative movement therebetween.

72. A lock having a rotatable bolt extendible out of the lock casing, a sliding plate movable with said bolt and having a spiral connection with said bolt for rotating the same upon relative lengthwise movement therebetween, means including a plate for controlling the forward direction of movement of the bolt, said bolt being rotatable with respect to said second-mentioned plate, said second-mentioned plate being constructed to prevent relative lengthwise movement between said sliding plate and said bolt until both sliding plate and bolt have together moved a predetermined distance forwardly.

73. A locking having a bolt, means including a plate for controlling the forward direction of movement of the bolt, and a plate having a spiral connection with said bolt for rotating the same, said second-mentioned plate being slidable relative to said first-mentioned plate.

74. A lock casing having a rotatable bolt extendible out of said casing, said bolt having a portion adjacent its inner end of reduced diameter; a sliding plate within said casing; means for actuating said sliding plate; a locking plate engaging said reduced portion of said bolt for holding the latter rotatably in assembled relation with respect to said sliding plate; and means for effecting rotation of said bolt.

75. A lock casing having a rotatable bolt extendible out of said casing, said bolt having a portion adjacent its inner end of reduced diameter; a sliding plate within said casing; means for actuating said sliding plate; a locking plate engaging said reduced portion of said bolt for holding the latter rotatably in assembled relation with respect to said sliding plate; and cam means having two coacting portions, one of which is upon said bolt, for rotating the latter upon relative movement therebetween.

76. A lock casing having a rotatable bolt extendible out of the casing; two sliding plates within said casing; means for pivotally securing said bolt to one of said plates; means forming a connection between the other of said plates and said bolt adapted upon relative movement therebetween to rotate said bolt; and actuating means operative upon said plates and related to the latter to permit successive conjoint and relative movements of said plates to take place.

77. A lock casing having a rotatable bolt extendible out of the casing; a sliding plate within said casing; means associated with said plate for rotatably supporting said bolt; a member carried by said sliding plate and movably mounted relative thereto; means forming a connection between said bolt and said member and adapted upon movement of said member relative to said plate to rotate said bolt; a crank operable from the exterior of said casing; and means operatively relating said crank to said sliding plate and to said member so that said crank first causes sliding movement of said plate with said member relative to said casing, thereby to move said bolt in the direction of its axis, and then causes movement of said member relative to said sliding plate, thereby to rotate said bolt.

78. A lock casing having a rotatable bolt extendible out of the casing; a sliding plate within said casing; means associated with said plate for rotatably supporting said bolt; a member carried by said sliding plate and movably mounted relative thereto; means forming a connection between said bolt and said member and adapted upon movement of said member relative to said plate to rotate said bolt; a crank arm operable from the exterior of said casing and connected to cause sliding movement of said sliding plate to take place, thereby to move said bolt in the direction of its axis; and connections between said crank arm and said member for causing the former to move the latter relative to said plate but only during a portion of the rotation of said crank arm, thereby to rotate said bolt.

79. A lock casing having a rotatable bolt extendible out of the casing; a sliding plate within said casing; means associated with said plate for rotatably supporting said bolt; a member carried by said sliding plate and movably mounted relative thereto; means forming a connection between said bolt and said member and adapted upon movement of said member relative to said plate to rotate said bolt; actuating means operable from the exterior of said casing for actuating said sliding plate and said member; and means forming connections between said actuating means and said sliding plate and said relatively movable member for causing both plate and member to move conjointly and for causing relative movement therebetween, said means including a lost motion connection.

80. A lock casing having a rotatable bolt extendable out of the casing; two sliding plates within said casing; means for pivotally holding said bolt relative to one of said plates; means forming a connection between the other of said plates and said bolt adapted upon relative movement therebetween to rotate said bolt, one of said plates having a slot; and actuating mechanism operable from the exterior of said casing and having means passing through said slot for moving the slotted plate, said two sliding plates being related to each other and to said means so that the latter, during a portion of its relative movement along said slot, causes movement of said other sliding plate.

81. A lock casing having a rotatable bolt extendible out of the casing; two sliding plates within said casing; means for pivotally holding said bolt relative to one of said plates; means forming a connection between the other of said plates and said bolt adapted upon relative movement therebetween to rotate said bolt, one of said plates having a slot; a crank operable from the exterior of said casing and having means extending through said slot sufficiently to permit engagement with the other plate, said means operating upon said last-mentioned other plate during a portion of its movement by said crank.

82. A lock casing having a rotatable bolt extendible out of the casing; a sliding plate within said casing; means associated with said plate for rotatably supporting said bolt; a member carried by said sliding plate and movably mounted relative thereto; means forming a connection between said bolt and said member and adapted upon movement of said member relative to said plate to rotate said bolt; said sliding plate having a slot; and a crank operable from the exterior of said casing and carrying means engaging said slot for moving both said slotted plate and said member, said means operating during a portion of the movement of rotation of said crank to move said member relative to said sliding plate.

83. A lock casing having a rotatable bolt extendible out of the casing; a sliding plate within said casing; means associated with said plate for rotatably supporting said bolt; a member carried by said sliding plate and movably mounted relative thereto; means forming a connection between said bolt and said member and adapted upon movement of said member relative to said plate to rotate said bolt, said sliding plate having a slot; and a crank operable from the exterior of said casing and carrying means engaging said slot for moving both said slotted plate and said member, said member having a cut-away portion and said crank-operated means being adapted, by coaction with said cut-away portion, to move said member relative to said slotted plate during a portion of the rotary movement of said crank.

84. A lock casing having a rotatable bolt extendible out of the casing; a sliding plate within said casing; means for pivotally securing said bolt to said plate; a crank operable from the exterior of said casing and carrying operating means at its outer end; said sliding plate having a slot with which said operating means of said crank coacts, said slot being shaped so that said crank and plate travel together during a part of the rotary movement of said crank and to permit the operating means of said crank to move relative to said plate during another portion of the rotary movement of said crank; an auxiliary sliding plate carried by said first sliding plate and connected to be moved relative to the first sliding plate by said operating means during the relative movement of the latter with respect to said first sliding plate; and connections between said sliding plate and said bolt for rotating the latter.

85. A lock casing having a rotatable bolt extendible out of the casing; a sliding plate within said casing; means for pivotally securing said bolt to said plate; a crank operable from the exterior of said casing and carrying operating means at its outer end; said sliding plate having a slot with which said operating means of said crank coacts, said slot being shaped so that said crank and plate travel together during a part of the rotary movement of said crank and to permit the operating means of said crank to move relative to said plate during another portion of the rotary movement of said crank; and means responsive to the relative movement between said operating means carried by said crank for rotating the bolt.

86. A lock casing having a rotatable bolt extendible out of the casing; two sliding plates within said casing; means for pivotally holding said bolt relative to one of said plates; means forming a connection between the other of said plates and said bolt adapted upon relative movement therebetween to rotate said bolt, one of said plates being slotted; and a crank operable from the exterior of said casing and having means for coacting with said slot for moving one of said plates, said crank being related to the other of said plates so that the latter is moved by said crank during a portion of the relative movement of said crank along said slot.

87. A lock casing having a rotatable bolt extendible out of the casing; two sliding plates within said casing; means for pivotally holding said bolt relative to one of said plates; means forming a connection between the other of said plates and said bolt adapted upon relative movement therebetween to rotate said bolt; means operable from the exterior of said casing for moving said other of said plates; and means preventing relative movement between said bolt and said other plate until the bolt has been extended sufficiently out of said casing and acting to cause said operating means to first move both of said plates together.

88. A lock casing having a rotatable bolt extendible out of the casing in the direction of the axis of rotation of said bolt; a main sliding plate for controlling the forward direction of movement of said bolt; an auxiliary sliding plate carried by said main sliding plate and having connections with said bolt adapted upon relative movement therebetween to rotate said bolt; operating means operable from the exterior of said casing and having connection with said auxiliary sliding plate; and means for preventing relative movement between said auxiliary sliding plate and said bolt until the bolt has been extended sufficiently out of said casing and acting to cause said main sliding plate to move with said auxiliary sliding plate.

In testimony whereof, I have signed my name to this specification, this 23rd day of July 1927.

HERMAN HANSEN.